United States Patent [19]

Wirtz

[11] 4,113,378
[45] Sep. 12, 1978

[54] LINEAR EXPOSURE CONTROL SYSTEM
[75] Inventor: John Stanley Wirtz, Henrietta, N.Y.
[73] Assignee: Itek Corporation, Lexington, Mass.
[21] Appl. No.: 773,568
[22] Filed: Mar. 2, 1977
[51] Int. Cl.² .................... G03B 27/76; G03B 27/52
[52] U.S. Cl. .................................... 355/55; 355/67; 355/69; 355/71
[58] Field of Search .................................... 355/67–71, 355/35, 38, 55, 83

[56] References Cited

U.S. PATENT DOCUMENTS

| 3,795,444 | 3/1974 | Glidden et al. | 355/68 |
| 3,884,576 | 5/1975 | Mochimaru et al. | 355/69 |
| 3,898,006 | 8/1975 | Kimura et al. | 355/69 |

Primary Examiner—L. T. Hix
Assistant Examiner—W. J. Brady
Attorney, Agent, or Firm—Homer O. Blair; Robert L. Nathans; Gerald H. Glanzman

[57] ABSTRACT

A magnification signal of 64 – 100% is applied as an input parameter to a specially designed relaxation oscillator which produces a pulse train wherein the pulses thereof have a duration which vary in linear fashion with respect to the magnification input signal, the relaxation oscillator employing a constant current source in series relationship with an integrating capacitor which produces a saw tooth signal having a slope which is constant regardless of variations in the amplitude of the magnification input signal. The output pulses from the relaxation oscillator are counted to define an exposure control interval which changes linearly with respect to the input magnification signal.

13 Claims, 2 Drawing Figures

LINEAR EXPOSURE CONTROL SYSTEM

BACKGROUND OF THE INVENTION

The present invention relates to the field of automatic exposure control systems for industrial cameras.

Exposure control systems are known in the art which generate a series of pulses, wherein the pulses thereof have intervals which vary as of function of an input parameter such as the intensity of illumination of the exposure lamps. If longer exposure intervals are desired, the duration of the pulses are increased so that when such pulses are applied to a counter and are counted down, it takes a longer period for the count to reach a predetermined value to define an exposure interval. Conversely if the duration of the pulses are reduced, frequency of counting down increases to thus define a shorter exposure interval.

For example, in U.S. Pat. No. 3,795,444 to Glidden et al, the input parameter for controlling a relaxation oscillator is generated by photodiode 20 which is light coupled to exposure lamp 17. Changes in the intensity of lamp 17 change the magnitude of the current applied to integrating capacitor 43 to vary the slope of the saw tooth pulses generated at the output circuit of amplifier 40. Thus changes in the illumination intensity of lamp 17 produce changes in the width of the pulses produced at the output of comparator 52 which in turn produce corresponding changes in the time required for counter 80 to reach a predetermined count to in turn define the exposure interval. A significant drawback of this system is that the pulse widths of the pulses applied to the counter vary non-linearly with respect to the light intensity of lamp 17 since such widths are a reciprocal function of the strength of the current applied by photodiode 20 to integrating capacitor 43.

Furthermore, the Glidden patent does not produce an exposure interval which is a linear function of changes in magnification of the image, which is an object of the present invention.

SUMMARY OF THE INVENTION

In accordance with a preferred embodiment of the present invention, a special relaxation oscillator having a constant current source is provided in series relationship with an integrating capacitor, wherein the slope of the integration signal is constant regardless of changes in the magnification signal applied as an input to the relaxation oscillator. The magnification (64 - 100%) signal is directly obtained by means of a linear potentiometer mechanically coupled to the focusing lens actuator. As the position of the lens actuator changes to produce magnification changes of 64 - 100%, the widths of the pulses produced by the relaxation oscillator vary linearly with respect to the position of the lens actuator so that when they are counted by a binary counter, the resulting exposure interval will vary linearly with respect to the position of the lens actuator.

Other objects, features, advantages of the present invention will become apparent upon the perusal of the following description taken in conjunction with the drawings in which FIG. 1 illustrates a preferred embodiment of the invention and FIG. 2 illustrates a pulse diagram useful in understanding the operation of the system of FIG. 1.

DETAILED DESCRIPTION

Figures 1, 2:
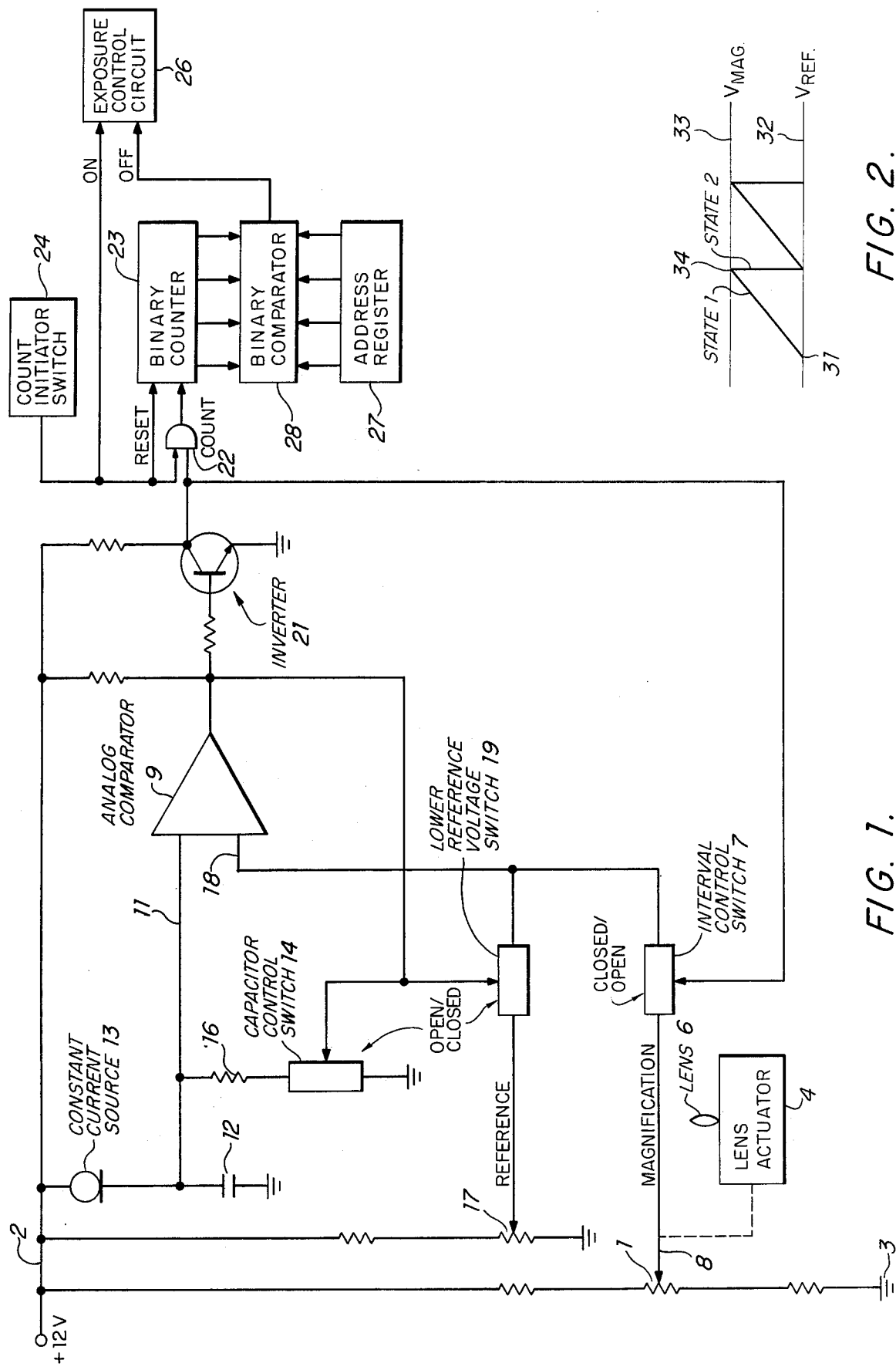

Referring now to FIG. 1, linear magnification potentiometer 1 is coupled between the positive power supply terminal 2 and ground 3. Changes in magnification of the object are produced by translating the position of lens actuator 4 so as to shift the position of lens 6 along the optical axis as is well understood by those skilled in the art. Such changes cause a linear change in the magnification signal applied to interval control switch 7 by the movable tap 8 of potentiometer 1, such tap 8 being mechanically coupled to lens actuator 4. Analog comparator 9 has a first input terminal 11 coupled to integrating capacitor 12 which in turn is connected in series with constant current source 13. Input terminal 11 is further connected as shown to capacitor control switch 14 via resistor 16. A reference voltage potentiometer 17 is coupled to the second input terminal 18 of comparator 9 via lower reference voltage switch 19. The second input terminal 18 of comparator 9 is also coupled to magnification signal potentiometer 1 through the interval control switch 7. The output circuit of analog comparator 9 is connected to the control terminals of switches 14 and 19 as shown. Inverter 21 has an input circuit coupled to the output circuit of comparator 9 and has an output circuit coupled to AND Gate 22 and the control terminal of switch 7 as shown.

The abovementioned structure applies a pulse train to binary counter 23 which commences counting upon the actuation of count initiator switch 24 which enables AND gate 22 and resets the counter to zero. This action defines the initiation of a conventional exposure circuit 26. When a predetermined count in address register 27 is reached by counter 23, an output pulse is produced by binary comparator 28 which defines the termination of the exposure interval.

At the beginning of the first interval of the cycle of the special relaxation oscillator of the invention represented by point 31 in FIG. 2, integrating capacitor 12 which was previously referenced to voltage level 32, commences charging by means of constant current source 13, since capacitor control switch 14 has just been opened. At this time, interval control switch 7 becomes closed to apply the magnification signal to the second input terminal 18 of comparator 9. Lower reference voltage switch 19 however, is in an open condition so that the reference voltage is not applied to input terminal 18. Capacitor 12 keeps charging until the voltage applied to the first input terminal 11 of comparator 9 reaches the magnification voltage level 33, illustrated in FIG. 2. At point 34, the comparator 9 changes state from its first state to its second state, which action causes the opening of interval control switch 7 and the closing of switches 14 and 19. The closure of switch 14, causes integrating capacitor 12 to be rapidly discharged through resistor 16 until the voltage applied to input terminal 11 of comparator 9 reaches the voltage reference level 32 of FIG. 2. Such action causes the comparator 9 to revert from the second state back to the first state and the foregoing cyclic process is repeated. It should be noted that during state 2, the reference voltage is applied to the comparator since the reference voltage switch 19 is closed when the comparator is in the second state. Inverter 21 functions to open interval control switch 7 when switches 14 and 19 are closed and vice versa. It is important to understand that the slopes of the saw tooth pulses applied to comparator 9 by integrating capacitor 12 do not vary with changes in the magnification signal applied to comparator 9, and hence the duration of the pulses applied to binary counter 23 will vary in linear fashion with respect to the position of movable tap 8 of linear potentiometer 17, in contrast with the abovementioned prior art.

It may be demonstrated that the exposure time in the Glidden prior art patent is proportional to:

$$T \sim \frac{C_{43}}{I_{43}} (V_{32} - V_Z(\frac{R_{56}}{R_{50}})) \qquad (1)$$

The subscripts refer to those employed in the sole FIGURE of the Glidden patent. Thus the duration of the pulses is a reciprocal function of the input parameter, namely the variable current through photodiode 20, and hence a non-linear output is produced.

In contrast, the slopes of the saw tooth pulses in the present invention remain constant, regardless of variations of the magnification signal (voltage level 33), and hence a linear output is attained.

It may be demonstrated that exposure time in the system of the present invention is proportional to:

$$T \sim \frac{C_{12}}{I_{12}} (V_{Mag.} - V_{Ref.}) \qquad (2)$$

Since I is constant in equation (2) due to constant current source 13, T is linearly proportional to the $V_{Mag}$, the magnification input signal in contrast to equation (1).

In summary, changes in the magnification signal produce corresponding changes in the widths of the pulse applied to counter 23 in linear fashion in contrast with the prior art and thus, the exposure interval will vary in linear fashion with respect to changes in magnification of the camera. Furthermore, it has been observed that the magnification (x) v. exposure time (y) curve is almost perfectly linear between 64 - 100% magnification so that an ordinary linear potentiometer may be employed for design simplicity in the system of the present invention which is preferably operated within this magnification range to obtain a high degree of accuracy.

Obviously numerous variations in the control switch means may be employed in practising the present invention. It should thus be appreciated that a special linear relaxation oscillator which is not available on the market, is provided and which is preferably controlled by a linear magnification transducer, such as a simple linear potentiometer which greatly simplifies design requirements.

In the system constructed in accordance with the invention, the control switches were CMOS CD 4016A's and the constant current source included an IN 5283 component and the comparator included an LM 211 component. The "down time" between the saw tooth pulses of FIG. 2 was 0.01% of the duration of the pulse period.

While preferred embodiments of the invention have been described, the teachings of this invention will readily suggest many other embodiments to those skilled in the art.

What is claimed is:

1. In an exposure control system for varying the exposure of an object to be photographed in linear fashion as a function of changes in magnification of the image of said object focused upon a photo-sensitive medium, the improvement comprising:
    a. movable lens means;
    b. a lens actuator for mechanically changing the position of said lens means for producing changes in magnification;
    c. magnification signal generating means for producing a magnification signal proportional to the position of said lens actuator;
    d. integration signal generating means for producing an integrated signal upon being actuated having a linear slope regardless of variations of said magnification signal;
    e. reference signal generating means;
    f. comparator means for assuming a first state when the signal applied to one input terminal thereof is greater than the signal applied to the other input terminal thereof, and for assuming a second state when the signal applied to the one input terminal thereof is less than the signal applied to the other input terminal thereof, said comparator means connected to compare the amplitudes of the signal produced by said integration signal generating means and said magnification signal generating means during a first interval and comparing the signal produced by said integration signal generating means and said reference signal generating means during a second interval, output pulses being produced by said comparator for each change of said comparator from said first state to said second state;
    g. switch means coupling said integration signal generating means and said magnification signal generating means to said comparator during a first interval and deactuating said integration signal generating means while coupling said reference signal generating means to said comparator during a second interval for referencing said integration signal generating means, thereby to cause said comparator to revert from said second state back to said first state and for thereafter causing said comparator to again compare the signal produced by said magnification signal generating means with the signal produced by said integrator; and
    h. counter means for counting the pulses produced by said comparator and for producing an output signal when the count thereof reaches a predetermined value, said output signal being utilized to terminate said exposure of said object.

2. The combination as set forth in claim 1 wherein said integration signal generating means includes a capacitor and a constant current source coupled thereto for charging said capacitor.

3. The combination as set forth in claim 2 further including switch means for discharging said capacitor during said second interval.

4. In an exposure control system for varying the exposure of an object to be photographed in linear fashion as a function of changes in magnification of the image of said object focused upon a photo-sensitive medium, the improvement comprising:
    a. movable lens means;
    b. a lens actuator for mechanically changing the position of said lens means for producing changes in magnification;
    c. magnification signal generating means for producing a magnification signal linearly proportional to the position of said lens actuator;
    d. integration signal generating means for producing an integrated signal upon being actuated having a linear slope, and including an integrator together with a constant current source for charging said integrator during a first interval for maintaining the slope of said integration signal produced by said integration signal generator constant, regardless of variations of said magnification signal;

e. reference signal generating means;

f. comparator means for assuming a first state when the signal applied to one input terminal thereof is greater than the signal applied to the other input terminal thereof, and for assuming a second state when the signal applied to the one input terminal thereof is less than the signal applied to the other input terminal thereof, said comparator means connected to compare the amplitudes of the signal produced by said integration signal generating means and said magnification signal generating means during a first interval and comparing the signal produced by said integration signal generating means and said reference signal generating means during a second interval, output pulses being produced by said comparator for each change of said comparator from said first state to said second state;

g. switch means responsive to said first state of said comparator coupling said integration signal generating means and said magnification signal generating means to said comparator during said first interval and deactuating said integration signal generating means while coupling said reference signal generating means to said comparator during said second interval for referencing said integrator of said integration signal generating means, thereby to cause said comparator to revert from said second state back to said first state and for thereafter causing said comparator to again compare the signal produced by said magnification signal generating means with the signal produced by said integration signal generating means; and h. counter means for counting the pulses produced by said comparator and for producing an output signal when the count thereof reaches a predetermined value, said output signal being utilized to terminate said exposure of said object.

5. The combination as set forth in claim 4 wherein said integration signal generating means includes a capacitor and a constant current source coupled in series therewith for charging said capacitor during said first interval.

6. The combination as set forth in claim 5 further including switch means for discharging said capacitor during said second interval.

7. In an exposure control system for varying the exposure of an object to be photographed in linear fashion as a function of changes in magnification of the image of said object focused upon a photo-sensitive medium, the improvement comprising:

a. movable lens means;

b. a lens actuator for mechanically changing the position of said lens means for producing changes in magnification from about 64% to 100%;

c. magnification signal generating means for producing a magnification signal linearly proportional to the position of said lens actuator;

d. integration signal generating means for producing an integrated signal upon being actuated having a linear slope, and including an integrator together with a constant current source for charging said integrator during a first interval for maintaining the slope of said integration signal produced by said integration signal generator constant, regardless of variations of said magnification signal;

e. reference signal generating means;

f. comparator means for assuming a first state when the signal applied to one input terminal thereof is greater than the signal applied to the other input terminal thereof, and for assuming a second state when the signal applied to the one input terminal thereof is less than the signal applied to the other input terminal thereof, said comparator means connected to compare the amplitudes of the signal produced by said integration signal generating means and said magnification signal generating means during a first interval and for comparing the signal produced by said integration signal generating means and said reference signal generating means during a second interval, output pulses being produced by said comparator for each change of said comparator from said first state to said second state;

g. switch means responsive to said first state of said comparator for coupling said integration signal generating means and said magnification signal generating means to said comparator during said first interval and for deactuating said integration signal generating means while coupling said reference signal generating means to said comparator during a second interval for referencing said integrator of said integration signal generating means, thereby to cause said comparator to revert from said second state back to said first state and for thereafter causing said comparator to again compare the signal produced by said magnification signal generating means with the signal produced by said integrator; and h. counter means for counting the pulses produced by said comparator and for producing an output signal when the count thereof reaches a predetermined value, said output signal being utilized to terminate said exposure of said object.

8. The combination as set forth in claim 7 wherein said integration signal generating means includes a capacitor and a constant current source coupled in series therewith for charging said capacitor.

9. The combination as set forth in claim 8 further including switch means for discharging said capacitor during said second interval.

10. In an exposure control system for varying the exposure of an object to be photographed in linear fashion as a function of changes in magnification of the image of said object focused upon a photo-sensitive medium, the improvement comprising:

a. movable lens means;

b. a lens actuator for mechanically changing the position of said lens means for producing changes in magnification from about 64% to 100%;

c. magnification signal generating means for producing a magnification signal linearly proportional to the position of said lens actuator;

d. integration signal generating means for producing an integrated signal upon being actuated having a linear slope, and including an integrator together with a constant current source for charging said integrator during a first interval for maintaining the slope of said integration signal produced by said integration signal generator constant, regardless of variations of said magnification signal;

e. reference signal generating means;

f. comparator for assuming a first state during a first interval and a second state during a second interval;

g. switch means responsive to the state of said comparator causing said comparator to compare the output signal produced by said integration signal generating means with the output signal produced by said magnification signal generating means during said first interval until the signals applied to said comparator by said integration signal generating means and said magnification signal generating means crossover with respect to each other for causing said comparator to revert to said second state, and for causing said comparator to compare the reference signal produced by said reference signal generating means with the changing signal produced by said integrator of said integration signal generating means due to deactuation of said integrator by said switch means during said second interval until the signals applied to said comparator again crossover with respect to each other, which in turn causes said comparator to revert from said second state back to said first state to repeat comparison of the signal produced by said integration signal generating means and said magnification signal generating means, thereby to cause said comparator to produce a series of pulses; and h. counter means coupled to said comparator for counting said pulses produced by said comparator and for producing an output signal when the count thereof reaches a predetermined value, said output signal being utilized to terminate said exposure of said object.

11. In an exposure control system for varying the exposure of an object to be photographed in linear fashion as a function of changes in magnification of the image of said object focused upon a photo-sensitive medium, the improvement comprising:

a. movable lens means;

b. a lens actuator for mechanically changing the position of said lens means for producing changes in magnification from about 64% to 100%;

c. magnification signal generating means for producing a magnification signal linearly proportional to the position of said lens actuator;

d. integration signal generating means for producing an integrated signal upon being actuated having a linear slope, and including an integrator together with a constant current source for charging said integrator during a first interval for maintaining the slope of said integration signal produced by said integration signal generator constant, regardless of variations of said magnification signal;

e. reference signal generating means;

f. a comparator having a first and second input circuit and an output circuit, said comparator assuming a first state when the signal applied to said first input circuit is greater than the signal applied to said second input circuit and a second state when the signal applied to said first input circuit is less than the signal applied to said second input circuit, output pulses being produced by said comparator for each change of said comparator from said first state to said second state;

g. an integrator control switch for causing said integrator to integrate the current produced by said constant current source when said integrator control switch is opened and for deactuating said integrator when said integrator control switch is closed;

h. an interval control switch for coupling said magnification signal generating means to said second input circuit of said comparator when said interval control switch is closed;

i. a reference voltage switch for coupling said reference signal generating means to said second input circuit of said comparator when said reference voltage switch is closed; and j. switching means coupled to the output circuit of said comparator for opening said integrator control switch and said reference control switch while closing said interval control switch during said first interval thereby to cause said comparator to compare the signal produced by said integration signal generating means with said magnification signal generating means during said first interval and to cause said integrator control switch and said reference voltage switch to be closed and said interval control switch to be opened during said second interval thereby to deactuate said integrator with respect to the reference signal produced by said reference signal generating means during said second interval; and k. counter means coupled to said comparator for counting said pulses produced by said comparator and for producing an output signal when the count thereof reaches a predetermined value, said output signal being utilized to terminate said exposure of said object.

12. The combination as set forth in claim 11 wherein said integrator comprises a capacitor and said integrator control switch is coupled thereto to cause said capacitor to discharge upon being closed;

13. The combination as set forth in claim 12 wherein the output circuit of said comparator is coupled to the control terminals of said integrator control switch and said reference voltage switch and further including inverter means having an input circuit coupled to the output circuit of said comparator and an output circuit and means coupled between the output circuit of said inverter and the control terminal of said interval control switch for causing said interval control switch to be closed when said integrator control switch and said reference voltage switch are opened and vice versa.

* * * * *